US011770273B2

(12) United States Patent
Gajic et al.

(10) Patent No.: US 11,770,273 B2
(45) Date of Patent: Sep. 26, 2023

(54) SUPPORTING BRIDGE MANAGED OBJECTS

(71) Applicant: NOKIA TECHNOLOGIES OY, Espoo (FI)

(72) Inventors: Borislava Gajic, Unterhaching (DE); Christian Mannweiler, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 45 days.

(21) Appl. No.: 17/617,069

(22) PCT Filed: Jun. 14, 2019

(86) PCT No.: PCT/EP2019/065706
§ 371 (c)(1),
(2) Date: Dec. 7, 2021

(87) PCT Pub. No.: WO2020/249228
PCT Pub. Date: Dec. 17, 2020

(65) Prior Publication Data
US 2022/0231882 A1  Jul. 21, 2022

(51) Int. Cl.
*H04L 12/54* (2022.01)
*H04L 47/2491* (2022.01)
*H04L 47/28* (2022.01)
*H04L 67/12* (2022.01)
*H04L 12/70* (2013.01)

(52) U.S. Cl.
CPC ...... *H04L 12/5601* (2013.01); *H04L 47/2491* (2013.01); *H04L 47/28* (2013.01); *H04L 67/12* (2013.01); *H04L 2012/5618* (2013.01)

(58) Field of Classification Search
CPC . H04L 12/5601; H04L 47/2491; H04L 47/28; H04L 67/12; H04L 2012/5618; H04W 4/70
See application file for complete search history.

(56) References Cited

U.S. PATENT DOCUMENTS

2020/0259896 A1* 8/2020 Sachs ...................... H04L 67/10

OTHER PUBLICATIONS

Christian Mannweiler et al., "Reliable and Deterministic Mobile Communications for Industry 4.0: Key Challenges and Solutions for the Integration of the 3GPP 5G System with IEEE Time-Sensitive Networking", (Year: 2019).*
International Search Report and Written Opinion dated Feb. 12, 2020 corresponding to International Patent Application No. PCT/EP2019/065706.

(Continued)

*Primary Examiner* — Kim T Nguyen
(74) *Attorney, Agent, or Firm* — SQUIRE PATTON BOGGS (US) LLP

(57) ABSTRACT

An apparatus includes at least one processor and at least one memory storing computer program code. The memory and the computer program code are configured, with the processor, to cause the apparatus to perform operating as a bridge in a time sensitive network system and providing functionality for assisting exchange of information of bridge managed objects between the apparatus and the time sensitive network system.

17 Claims, 4 Drawing Sheets

(56) References Cited

OTHER PUBLICATIONS

Christian Mannweiler et al., "Reliable and Deterministic Mobile Communications for Industry 4.0: Key Challenges and Solutions for the Integration of the 3GPP 5G System with IEEE Time-Sensitive Networking," Mobilkommunikation: Technologien und Anwendungen: Vortrage der 24. May 16, 2019, XP009516640.

Vivo, "TSN bridge Managed Objects (MO) collection," 3GPP Draft; S2-1901636, 3GPP TSG-SA2 Meeting #131, Santa Cruz, Tenerife, Spain, Feb. 19, 2019, XP051610240.

3GPP TS 23.501 V16.0.2 (Apr. 2019), Technical Specification, 3rd Generation Partnership Project; Technical Specification Group Services and System Aspects; System Architecture for the 5G System; Stage 2 (Release 16), Apr. 2019.

3GPP TS 23.502 V16.0.2 (Apr. 2019), Technical Specification, 3rd Generation Partnership Project; Technical Specification Group Services and System Aspects; Procedures for the 5G System; Stage 2 (Release 16), Apr. 2019.

3GPP TS 23.503 V16.0.0 (Mar. 2019), Technical Specification, 3rd Generation Partnership Project; Technical Specification Group Services and System Aspects; Policy and Charging Control Framework for the 5G System; Stage 2 (Release 16), Mar. 2019.

3GPP TS 23.734 V16.1.0 (Mar. 2019), Technical Report, 3rd Generation Partnership Project; Technical Specification Group Services and System Aspects; Study on enhancement of 5G System (5GS) for vertical and Local Area Network (LAN) services (Release 16), Mar. 2019.

3GPP TS 28.541 V16.0.0 (Mar. 2019), Technical Specification, 3rd Generation Partnership Project; Technical Specification Group Services and System Aspects; Management and orchestration; 5G Network Resource Model (NRM), Stage 2 and stage 3 (Release 16), Mar. 2019.

3GPP TS 32.150 V15.0.0 (Jun. 2018), Technical Specification, 3rd Generation Partnership Project; Technical Specification Group Services and System Aspects; Telecommunication management; Integration Reference Point (IRP) concept and definitions (Release 15), Jun. 2018.

3GPP TS 32.156 V16.1.0 (Mar. 2019), Technical Specification, 3rd Generation Partnership Project; Technical Specification Group Services and System Aspects; Telecommunication management; Fixed Mobile Convergence (FMC) Model repertoire (Release 16), Mar. 2019.

* cited by examiner

SUPPORTING BRIDGE MANAGED OBJECTS

FIELD

This disclosure relates to communications, and more particularly to an apparatus, method, and computer program in a communication system. More particularly the present invention relates to enabling the integration of the 5G system with a time-sensitive-network.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

In a wireless system at least a part of communications occurs over wireless interfaces. Examples of wireless systems include public land mobile networks (PLMN), satellite based communication systems and different wireless local networks, for example wireless local area networks (WLAN).

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as 5GS (5G system) or New Radio (NR).

The Internet of Things (IoT) is the interconnection via the Internet of computing devices, enabling those devices to send and receive data. The tactile industrial network, also known as the Industrial Internet of Things (IIoT) relates to the industrial implementation of the IoT. For example IIoT may relate to interconnected sensors, instruments and other devices networked together in an industrial context such as manufacturing or the like.

STATEMENT OF INVENTION

According to a first aspect there is provided an apparatus comprising means for performing: operating as a bridge in a time sensitive network system; and providing functionality for assisting exchange of information of bridge managed objects between the apparatus and the time sensitive network system.

According to some examples, the functionality comprises making available a list of bridge managed objects supported by the apparatus.

According to some examples, the list of bridge managed objects is use-case dependent.

According to some examples, the apparatus comprises a Policy Control Function.

According to some examples, the time sensitive network comprises a fully centralized network configuration model; or a centralized network/distributed user configuration model.

According to some examples, the apparatus comprises a User Plane Function.

According to some examples, the time sensitive network comprises a distributed network configuration model.

According to some examples, the functionality comprises making available information required for at least one service that is provided by the apparatus to one or more entities.

According to some examples, the at least one service comprises one or more of: reading or requesting a bridge managed object; creating a bridge managed object; modifying or updating a bridge managed object; deleting a bridge managed object.

According to some examples, the apparatus comprises an interface for exposure of the information required for at least one service, wherein the exposure of the information required for at least one service comprises exposure of the information of bridge managed objects to the one or more entities.

According to some examples, the apparatus comprises an interface for receiving the information required for at least one service from the one or more entities.

According to some examples, the means are further configured to perform activating or de-activating one or more policies based on data received from the one or more entities.

According to some examples, the means are further configured to perform activating or de-activating the one or more policies on a per network function basis.

According to some examples, the one or more entities comprise a time sensitive network Centralized Network Configuration entity or a network management function of a mobile network.

According to some examples, the functionality comprises reporting a status of one or more bridge management objects of the apparatus.

According to some examples, the means are further configured to perform reporting only a status of one or more bridge management objects subscribed to by an application function, wherein the status is reported directly to the application function or is reported to the application function via a network exposure function.

According to some examples, the application function comprises a time sensitive network Centralized Network Configuration entity or a management function of a 5G mobile network.

According to some examples, the means comprises at least one processor; and at least one memory including computer program code, the at least one memory and computer program code configured to, with the at least one processor, cause the performance of the apparatus.

According to some examples the apparatus comprises a physical apparatus.

According to some examples the apparatus comprises a virtual apparatus.

According to some examples the apparatus comprises a virtual apparatus comprised within a physical apparatus.

According to a second aspect there is provided an apparatus comprising at least one processor; and at least one memory including computer program code; the at least one memory and the computer program code configured to, with the at least one processor, cause the apparatus at least to perform operating as a bridge in a time sensitive network system; and providing functionality for assisting exchange of information of bridge managed objects between the apparatus and the time sensitive network system.

According to a third aspect there is provided an apparatus comprising: operating circuitry for operating as a bridge in a time sensitive network system; and providing circuitry for providing functionality for assisting exchange of information of bridge managed objects between the apparatus and the time sensitive network system.

According to a fourth aspect there is provided a method comprising: operating an apparatus as a bridge in a time sensitive network system; and providing functionality for assisting exchange of information of bridge managed objects between the apparatus and the time sensitive network system.

According to some examples, the functionality comprises making available a list of bridge managed objects supported by the apparatus.

According to some examples, the list of bridge managed objects is use-case dependent.

According to some examples, the apparatus comprises a Policy Control Function.

According to some examples, the time sensitive network comprises a fully centralized network configuration model; or a centralized network/distributed user configuration model.

According to some examples, the apparatus comprises a User Plane Function.

According to some examples, the time sensitive network comprises a distributed network configuration model.

According to some examples, the functionality comprises making available information required for at least one service that is provided by the apparatus to one or more entities.

According to some examples, the at least one service comprises one or more of: reading or requesting a bridge managed object; creating a bridge managed object; modifying or updating a bridge managed object; deleting a bridge managed object.

According to some examples, the exposure of the information required for at least one service comprises exposure of the information of bridge managed objects to the one or more entities via an interface of the apparatus.

According to some examples, the method comprises receiving the information required for at least one service from the one or more entities via an interface of the apparatus.

According to some examples, the method comprises activating or de-activating one or more policies based on data received from the one or more entities.

According to some examples, the method comprises activating or de-activating the one or more policies on a per network function basis.

According to some examples, the one or more entities comprise a time sensitive network Centralized Network Configuration entity or a network management function of a mobile network.

According to some examples, the functionality comprises reporting a status of one or more bridge management objects of the apparatus.

According to some examples, the method comprises reporting only a status of one or more bridge management objects subscribed to by an application function, wherein the status is reported directly to the application function or is reported to the application function via a network exposure function.

According to some examples, the application function comprises a time sensitive network Centralized Network Configuration entity or a management function of a 5G mobile network.

According to some examples the apparatus comprises a physical apparatus.

According to some examples the apparatus comprises a virtual apparatus.

According to some examples the apparatus comprises a virtual apparatus comprised within a physical apparatus.

According to a fifth aspect there is provided a computer program comprising instructions for causing an apparatus to perform at least the following: operating as a bridge in a time sensitive network system; and providing functionality for assisting exchange of information of bridge managed objects between the apparatus and the time sensitive network system.

According to a sixth aspect there is provided a computer program comprising instructions stored thereon for performing at least the following: operating an apparatus as a bridge in a time sensitive network system; and providing functionality for assisting exchange of information of bridge managed objects between the apparatus and the time sensitive network system.

According to a seventh aspect there is provided a non-transitory computer readable medium comprising program instructions for causing an apparatus to perform at least the following: operating as a bridge in a time sensitive network system; and providing functionality for assisting exchange of information of bridge managed objects between the apparatus and the time sensitive network system.

According to an eighth aspect there is provided a non-transitory computer readable medium comprising program instructions stored thereon for performing at least the following: operating an apparatus as a bridge in a time sensitive network system; and providing functionality for assisting exchange of information of bridge managed objects between the apparatus and the time sensitive network system.

BRIEF DESCRIPTION OF FIGURES

The invention will now be described in further detail, by way of example only, with reference to the following examples and accompanying drawings, in which.

DETAILED DESCRIPTION

Figure 1:
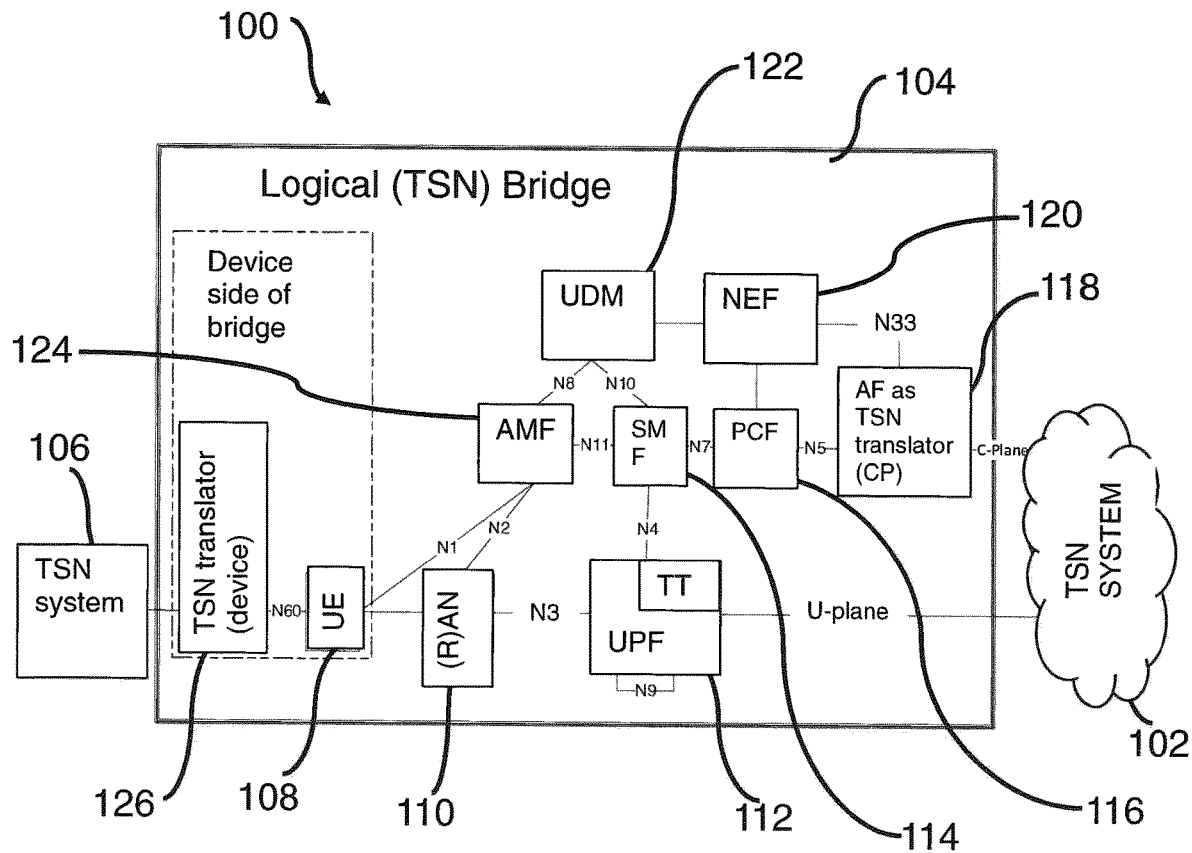
FIG. 1 shows a schematic example of a time sensitive network (TSN)

The present disclosure relates to the tactile industrial network, also known as Industrial IoT (IIoT) or Industry 4.0 networks. In such networks, 3GPP technologies are applied in addition to wired time sensitive networking (TSN) in industrial environments to provide flexibility (in terms of mobility) and scalability (in terms of number of sensors or actuators). 3GPP SA2 (Architecture) has finalized the Study on 5GS Enhanced support of Vertical and LAN Services in 3GPP TR 23.734 "Study on enhancement of 5G System (5GS) for vertical and Local Area Network (LAN) services", v16.1.0. This document selects the so-called "bridge model" (black box) option for the integration of 3GPP with TSN as a baseline for 3GPP normative work. FIG. 1, which is taken from 3GPP TS 23.501 v16.02 (FIG. 4.4.8.2-1), shows this bridge model concept, where in the system 100 a first TSN system 102 is connected to a second TSN system 106 via a 5G system 104 acting as a logical TSN bridge. As is known, the 5GS comprises one or more UE 108 which is connected in the system via a radio access node (RAN) 110 and access and mobility management function (AMF) 124. The RAN 110 is connected to AMF 124 and user plane function (UPF) 112. UPF 112 is connected to session management function (SMF) 114. SMF 114 is connected to policy control function (PCF) 116, which in turn is connected to application function (AF) 118. Also shown are unified data management (UDM) function 122 which connects to AMF 124 and SMF 114, and network exposure function (NEF) 120 which is connected to UDM 122 and AF 118. A TSN translator is shown at 126 for communicating between 5GS 104 and TSN system 106, and AF 118 acts as TSN translator with TSN system 102. Each TSN system 102 and 106 may comprise one or more TSN end-points or devices such as temperature sensors, valves, programmable logic controllers (PLCs). The present disclosure takes this bridge model as a baseline for improvements thereof.

The 3GPP has agreed on modelling the 5GS as a TSN bridge (see 3GPP, TS 23.501, and in particular section 5.28.1 thereof). The present inventors have identified that in order to achieve a transparent integration of a 3GPP 5GS into a TSN system, 5GS needs to appear towards the TSN management entities as a regular TSN bridge. "Transparent" in this context means that from TSN perspective the 3GPP mobile network appears as a TSN bridge, so no changes to the common TSN procedures and protocols are needed in order to support the integration with 3GPP network (as 3GPP network can be handled as any other, common TSN bridge). From 3GPP network point of view the TSN appears as a data network. This also means that the 5GS bridge needs to be managed in the same way as the common TSN bridge. For example, the 5GS bridge needs to maintain and expose a set of bridge managed objects towards the TSN CNC and have interfaces towards TSN management entities. Furthermore, the 5GS bridge needs to comply with the configurations of the bridge managed objects parameters carried out by the TSN CNC (Centralized Network Configuration). This is not a straightforward task for at least the following reasons:

Different sets of bridge managed objects (as defined in the IEEE 802.1 standards) need to be maintained and exposed by the 5GS bridge, in order to enable configuration of bridge features including TSN features Exact number and the type of bridge managed objects is use-case-dependent, e.g. it depends on the configuration model used (centralized or distributed), exact standards and protocols used (LLDP, FRER, SRP, etc.)

Utilization of information from bridge managed objects as configured by CNC as configuration information for the 5GS network functions may require the establishment of complex rulesets taking into account the deployment and configuration of 5GS network as well as the dependencies between TSN and 5G network parameters.

Furthermore, 3GPP looks to further develop the TSC concepts which enable native support in 5G for local area network (LAN) and wide area network (WAN) services that require end-to-end (E2E) deterministic communication. Such concepts also need to allow plug-in compatibility with industrial standards such as TSN, Profinet, etc.

Regardless of the approach taken (e.g. integrating transparently the 5GS bridge into the TSN system or enabling the native support in 5GS for deterministic communication), the present inventors have identified that the 5GS needs to consider the following issues:

a) interaction/interfacing with external control and management systems, in particular TSN CNC;

b) exposing/abstracting the information towards the external control and management entities in the format required by the external management and control entities c) offering a service-based interface for external control and management entities to receive management and control information, e.g., to support integration with a TSN system.

The information in c) can be further used for configuring individual network functions.

For the approach of transparently integrating the 5GS bridge into the TSN system, at least some parts of the required functionalities may reside in 3GPP external functions, such as Application Function (AF). In order to appear as a bridge, the 5GS needs to incorporate the so-called "TSN Translator" functions at the network and the UE side (see TSN translators 118 and 126 in FIG. 1). Such translators include a set of functionalities such as: Forwarding and queuing of TSN frames with respect to schedules, Frame Replication and Elimination for Reliability (FRER), support for Link Layer Discovery Protocol, support for packet buffering for de-jittering, support for non-TSN-aware end stations, etc. In other words, the translators convert protocols/procedures and information/data models between the two systems.

However, some parts of the aforementioned translator functionalities may reside in 3GPP control functions such as PCF (policy control function) and need to be reflected in the current NRM (Network Resource Model) of such control functions. For example, PCF NRM currently does not include the information needed for exposure and maintenance of BMOs (Bridge Managed Objects). However, for the approach of native (i.e., standalone) support for deterministic communication (TSC service), such functionality needs to be within PCF (or other c-plane function of 5GS) in order to make the solution standalone without relying on external functions such as Application Functions (AFs). Having such NRM extensions enables the full control of the interaction with external industrial management and control entities.

This present disclosure proposes NRM extensions of the 5G network functions (NFs) needed for supporting the transparent 5G-TSN integration approach ("bridge" or "black box" model) as described in 3GPP TS 23.501 and discussed briefly above and with respect to FIG. 1. Such extensions support the TSN Bridge Managed Objects (BMOs) that need to be exchanged between 5GS and TSN. The present disclosure proposes four options for extensions of Policy Control Function (PCF)/User Plane Function (UPF) NRM and functionality in order to support TSN-5G integration. Such extensions will enable the 5G NFs to compose, expose, and consume the TSN Bridge Managed Objects (BMOs) that need to be exchanged between 5GS and TSN. Such extensions will indicate which BMOs are supported by the 5GS bridge and what are their values. In examples the BMO handling includes (but it is not limited to):

- interaction/interfacing with external control and management systems, e.g. by providing the information on 5GS bridge towards the TSN CNC such as bridge delay, port status etc.
- exposure of information from 5GS bridge in the format required by the TSN. e.g., for 5GS bridge delay capabilities, 5GS exposes towards the CNC in total four parameters and corresponding values in nanoseconds, sending 'portUp' or 'portDown' notifications towards TSN, etc. The "up" status of the port means that it is ready to transmit and receive network traffic, "down" means that port is not ready, e.g. due to some fault (these are IEEE defined terms).
- receiving management and control information from external entities such as TSN CNC. This information can be used for 5GS configuration, e.g., based on the 802.1Qbv gate schedules received by CNC, 5GS derives the scheduling policies at RAN, applies packet filtering at UPF based on VLAN to port assignments etc.

The proposed options for PCF/UPF extensions discussed briefly above are now discussed in more detail below.

Option 1: Adding New Attribute "BMOList" to PCF IOC

Table 1 below shows a proposed PCF network resource model (NRM). The NRM defines which attributes the PCF needs to support and what are the characteristics of such attributes.

TABLE 1

| Attribute name | Support Qualifier | isReadable | isWritable | isInvariant | isNotifyable |
|---|---|---|---|---|---|
| pLMNIdList | M | T | T | F | T |
| sBIFQDN | M | T | T | F | T |
| sBIServiceList | M | T | F | F | T |
| sNSSAIList | CM | T | T | F | T |
| BMOList | O | T | T | F | T |

In Table 1, T=true (i.e. feature is supported), F=false (i.e. feature is not supported), O=optional (i.e. feature may or may not be supported), M=mandatory (i.e. feature shall be supported) and CM=conditional mandatory (i.e. items that are mandatory under certain conditions, specifically). All items having the support qualifier CM shall have a corresponding constraint defined in the IS specification. If the specified constraint is met then the items shall be supported. For NSSAIList the condition is "network slicing feature is supported". These terms are defined in 3GPP TS 32.150 . . . .

As shown, the attributes included in the table are pLMNIdList; sBIFQDN; sBIServiceList; sNSSAIList. As described in 3GPP TS 28.541: pLMNIdList is a list of supported PLMNs (Public Land Mobile Networks); sBIFQDN is used to indicate the FQDN (fully qualified domain name) of the registered NF instance in service-based interface; sBIServiceList is used to indicate the all supported network function services registered on service-based interface; sNSSAIList specifies the S-NSSAI list to be supported by the new NSI (network slice instance) to be created or the existing NSI to be re-used. NSSAI=Network Slice Selection Assistance Information. This is by way of example and in other examples different attributes may be included. As shown by the highlighted final row, this disclosure proposes a further IOC element—namely "BMOList". The BMO List represents a list of BMOs that are supported by the 5GS bridge for a given use case. For example a use case may include specific TSN configuration model used (fully centralized and distributed user/centralized network configuration model), specific protocols/standards used etc.

In some examples the BMOList attribute contains the minimal set of BMOs that 5GS needs to support the IEEE 802.1Q, 802.1AS and 802.1AB standards. The BMOList may contain additional entries depending on the standards/protocols used in an actual setup. For example if the 5GS bridge implements the FRER (Frame Replication and Elimination for Reliability) protocol then the BMOs related to IEEE 802.1CB should be included in the BMOList. The exact list of BMOs and their associated attributes that need to be supported in order to enable specific standard/protocol is described in the corresponding standard. For example IEEE 802.1Qcc defines the Bridge Delay managed object, with the following attributes: independentDelayMin, independentDelayMax, dependentDelayMin, dependentDelayMax. Therefore, in such an example the bridge delay managed object of the 5GS bridge must support those four parameters.

In some examples the BMOList attribute is optional as it only applies in TSN-5GS integration following the "black box" model of 3GPP TS 23.501. Furthermore, in some examples the BMOList attribute in PCF IOC may be applicable only to the TSN centralized network configuration models where TSN CNC is present and can be modelled as an AF with an interface towards the PCF (if necessary via NEF (network exposure function)).

As shown in Table 1 the proposed BMO List is optional in at least some practical implementations (support qualifier=O), the BMO List is readable, the BMO List is writable, the BMO list is not invariant, and the BMO list is notifyable. As described in 3GPP TS 32.156, "invariant" means that the attribute value is set at object creation time and cannot be changed; and "notifyable" identifies if a notification shall be sent in case of a value change.

The additional attribute BMOList helps handle TSN-3GPP integration.

Option 2: Defining a New Service in the List of Supported Services

The new service may in some examples be termed Npcf_BMOHandling Service. In some examples the new service builds on the existing PCF IOC attribute sBISServiceList. Thus in some examples the extension does not require an entirely new attribute. Accordingly the PCF may be enabled to support a new service. In examples the new service exposes different BMOs towards external consumers, i.e., TSN management entities. Further service capabilities may comprise gathering the information from 5GS for updating the BMO values, potentially also utilizing the BMO configurations as received from CNC for configurations within 5GS.

The consumer of such service may be a TSN management entity such as CNC, or an Application Function acting as a CNC. The proposed new PCF services include:
1) a service-based interface (SBI) for exposure of (at least) the mandatory TSN BMOs towards the TSN CNC and
2) an SBI for receiving (at least) the mandatory BMOs from the TSN CNC.

Figure 2:
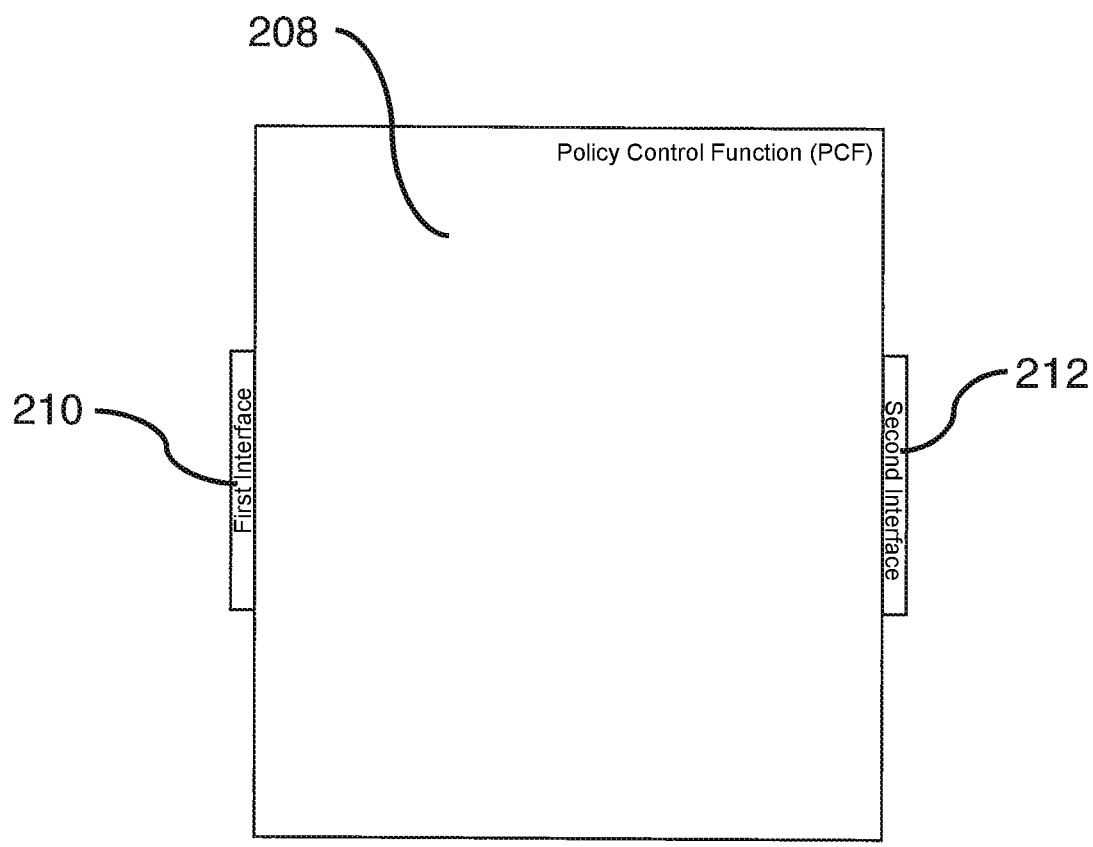
FIG. 2 schematically shows an example of an apparatus according to an example.

This is schematically shown in FIG. 2, which shows a PCF 208 comprising a first interface 210 for providing 1) above, and a second interface 212 for providing 2) above.

Using 2), the PCF may activate or de-activate policies for specific NFs of the 5GS and also update the information in the BMOs that are exposed towards the CNC. In some examples, to avoid modifications in the TSN specifications, the exposed information adheres to the format expected by the CNC, e.g. bridge delay parameters must comprise the delay independent and dependent on the frame length.

Table 2 below illustrates the proposed extensions of PCF supported services. The proposed further service is shown in the highlighted final row.

sBIServiceList. According to examples the proposed new event is added to the event list and can be exchanged between PCF is and external AFs for notification regarding the supported BMOs in 5GS and their values.

In more detail, the AF (application function) may subscribe/unsubscribe to notifications of events from the PCF for the PDU Session to which the AF session is bound. The events that can be subscribed by the AF are listed in Table 6.1.3.18-1 of 3GPP TS 23.503. The present inventors have identified that in order to support the TSN-5GS integration, the events exchanged with AF (where AF may be the TSN tNe) need to provide the information on supported BMOs and their status. Furthermore, the present inventors have

TABLE 2

| Service Name | Description | Reference in TS 23.502 [3] |
|---|---|---|
| Npcf_AMPolicyControl | This PCF service provides Access Control, network selection and Mobility Management related policies, UE Route Selection Policies to the NF consumers. | 5.2.5.2 |
| Npcf_SMPolicyControl | This PCF service provides session related policies to the NF consumers. | 5.2.5.4 |
| Npcf_PolicyAuthorization | This PCF service authorises an AF request and creates policies as requested by the authorised AF for the PDU Session to which the AF session is bound to. This service allows the NF consumer to subscribe/unsubscribe to the notification of Access Type and RAT type, PLMN identifier, access network information, usage report etc. | 5.2.5.3 |
| Npcf_BDTPolicyControl | This PCF service provides background data transfer policy negotiation and optionally notification for the renegotiation to the NF consumers. | 5.2.5.5 |
| Npcf_UEPolicyControl | This PCF service provides the management of UE Policy Association to the NF consumers. | 5.2.5.6 |
| Npcf_EventExposure | This PCF service provides the support for event exposure. | 5.2.5.7 |
| Npcf_BMOHandling | This PCF service provides the support for TSN-5GS integration by BMO handling. It exposes TSN BMOs towards TSN entities and can be provided with TSN BMOs from TSN entities. | |

Table 2 also shows examples of other services that may be provided by the PCF, and their description, namely: Npcf_AMPolicyControl; Npcf_SMPolicyControl; Npcf_PolicyAuthorization; Npcf_BDTPolicyControl; Npcf_UEPolicyControl; Npcf_EventExposure.

Option 3—Defining a New Event Type

This option comprises defining a new event type of Npcf_EventExposure. In examples such an extension does not require definition of a new attribute in PCF IOC but would build on the existing PCF IOC attribute sBIServiceList, and in particular Npcf_EventExposure service from the identified that any change in the BMO status needs to be signalled towards the AF (TSN CNC) which is subscribed to these events. The information on events can be exchanged between PCF and AF (e.g. TSN CNC) either via direct subscription or via NEF. For example a change in port status of 5GS Bridge from "up" to "down" and vice versa upon the change of the status of corresponding PDU session can be signalled towards the AF (e.g. TSN CNC) as an event. Table 3 below illustrates the proposed extension of PCF events, with the new event "BMO status" in the highlighted row.

TABLE 3

| Event | Description | Conditions for reporting | Availability for Rx PDU Session | Availability for N5 PDU Session | Availability for Bulk Subscription (NOTE 1) |
|---|---|---|---|---|---|
| PLMN Identifier Notification | The PLMN identifier where the UE is currently located. | AF | Yes | Yes | Yes |
| Change of Access Type | The Access Type and, if applicable, the RAT Type of the PDU Session has changed. | AF | Yes | Yes | Yes |

TABLE 3-continued

| Event | Description | Conditions for reporting | Availability for Rx PDU Session | Availability for N5 PDU Session | Availability for Bulk Subscription (NOTE 1) |
|---|---|---|---|---|---|
| Signalling path status | The status of the resources related to the signalling traffic of the AF session. | AF | Yes | No | No |
| Access Network Charging Correlation Information | The Access Network Charging Correlation Information of the resources allocated for the AF session. | AF | Yes | No | No |
| Access Network Information Notification | The user location and/or timezone when the PDU Session has changed in relation to the AF session. | AF | Yes | No | No |
| Reporting Usage for Sponsored Data Connectivity | The usage threshold provided by the AF has been reached; or the AF session is terminated. | AF | Yes | Yes | No |
| Resource allocation status | The status of the resources related to the AF session (established/released). | AF | Yes | Yes | No |
| QoS targets can no longer (or can again) be fulfilled | The QoS targets can no longer (or can again) be fulfilled by the network for (a part of) the AF session. | AF | No | Yes | No |
| BMO status | The status of supported BMOs in TSN-5GS integration | AF | Yes | Yes | Yes |
| Out of credit | Credit is no longer available. | AF | Yes | No | No |

(NOTE 1):
Additional parameters for the subscription as well as reporting related to these events are described in TS 23.502 [6].

Table 3 also shows other event types which may be supported by an AF, namely: PLMN Identifier Notification; Change of Access Type; Signalling path status; Access Network Charging Correlation Information; Access Network Information Notification; Reporting Usage for Sponsored Data Connectivity; Resource allocation status; QoS targets can no longer (or can again) be fulfilled; Out of credit.

Option 4—Adding New Attribute to UPF IOC

This option comprises adding a new attribute to UPF IOC which represents the list of supported BMOs, i.e. BMOList. Such additional attribute in UPF IOC represents a list of BMOs that are supported by the 5GS bridge. In some examples the extension of UPF IOC is required in case the TSN fully distributed configuration model is used, whereas "Option 1" above only supports TSN fully centralized and distributed user/centralized configuration models.

In more detail, in the fully distributed TSN configuration model, a specific set of standards/protocols may be implemented which differ from the standards/protocols used in the centralized configuration models. For example, SRP (Stream Reservation Protocol) defined in IEEE 802.1Q and IEEE 802.1Qcc may be applicable, and corresponding bridge managed objects and attributes need to be maintained by 5GS bridge. IEEE 802.1Q defines the SRP Bridge base table object with attributes such as 'msrpEnabledStatus', 'talkerPruning', msrpLatencyMaxFrameSize etc. The bridge managed objects and associated attributes which describe SRP and its extensions, need to be supported by the 5GS bridge for operating in the fully distributed TSN configuration model.

In some examples, the proposed BMOList attribute in UPF IOC is optional in some practical implementations as it only applies in TSN-5GS integration following the "black box" model of 3GPP TS 23.501. Furthermore, in some examples the BMOList attribute in UPF IOC may be applicable only to the fully distributed TSN configuration model where there is no TSN CNC and the information is exchanged between bridges via user plane, i.e., there is no signalling between control plane entities. Table 4 below illustrates the proposed extension of UPF NRM, with the proposed new attribute shown in the highlighted row.

TABLE 4

| Attribute name | Support Qualifier | isReadable | isWritable | isInvariant | isNotifyable |
|---|---|---|---|---|---|
| pLMNIdList | M | T | T | F | T |
| nRTACList | M | T | T | F | T |
| sNSSAIList | CM | T | T | F | T |
| BMOList | O | T | T | F | T |

As shown, the proposed new attribute, "BMO List", has a support qualifier of "O" (optional), is readable (i.e. true), is writable (i.e. true), is not invariant (i.e. false), and is notifyable (i.e. true).

It will be understood that Options 1 to 4 above have been presented separately for ease of understanding, but that they are not mutually exclusive. That is, in some examples one or more of options 1 to 4 may be combined. For example, if the PCF service is available then the PCF IOC extension with the list of supported BMOs may be implemented (option 1). Moreover, the event related to BMO status (option 3) may be defined in a way to notify the AF (i.e., TSN CNC) on any change of BMO values, e.g. if the exposed bridge delay cannot be fulfilled anymore.

Furthermore, in some examples the 5GS bridge may have to simultaneously support fully distributed and fully centralized configuration approaches on different ports. In such a scenario, the BMOs for the distributed model may be maintained at UPF which hosts ports that provide the connection to neighboring TSN bridges. At the same time, the PCF may need to maintain the BMOs needed for communication with TSN CNC in fully centralized configuration models.

Figure 3:
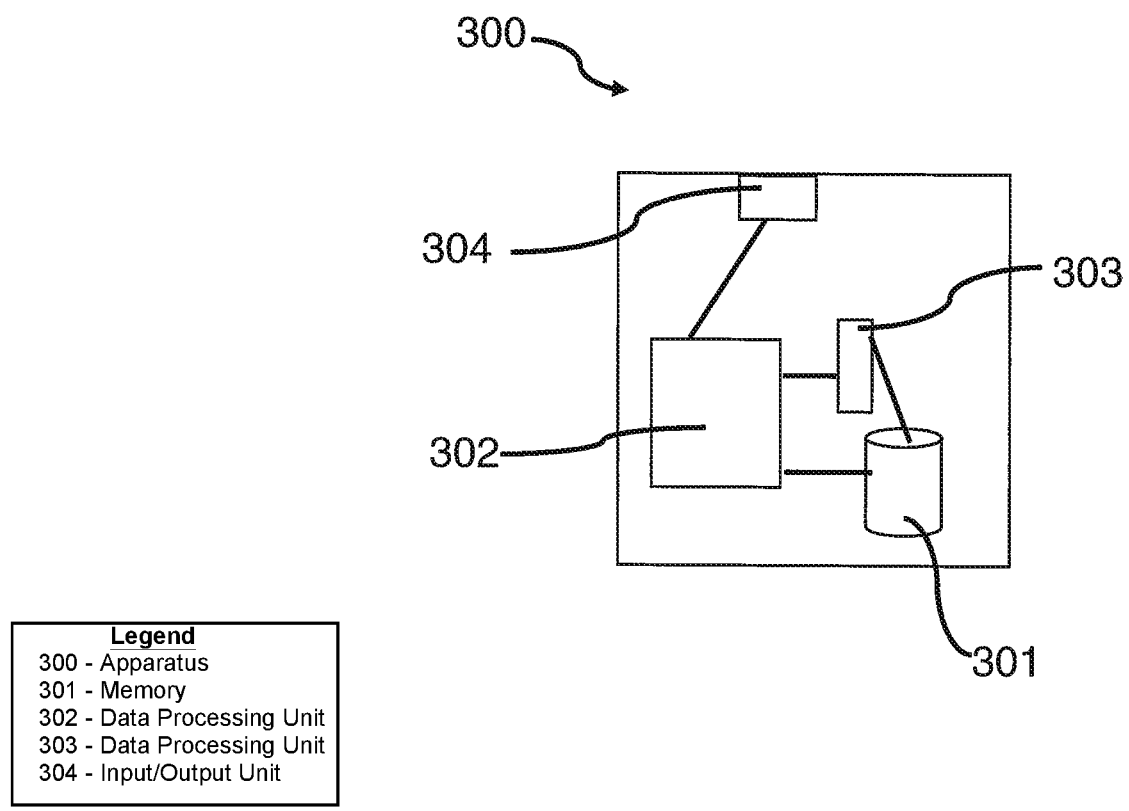
FIG. 3 schematically shows an example of an apparatus according to an example.

FIG. 3 schematically shows an example of an apparatus according to an example. For example, such an apparatus may comprise an AF or PCF or UPF as described above. The apparatus 300 comprises at least one memory 301, at least one data processing unit 302, 303 and an input/output interface 304. Via the interface the apparatus can be coupled to a receiver and a transmitter of the apparatus. The receiver and/or the transmitter may be implemented as a radio front end or a remote radio head. For example the apparatus 300 or processor 301 can be configured to execute an appropriate software code to provide the control functions. It will also be understood that in some examples the apparatus 300 is virtual or logical rather than a physical apparatus.

Figure 4:
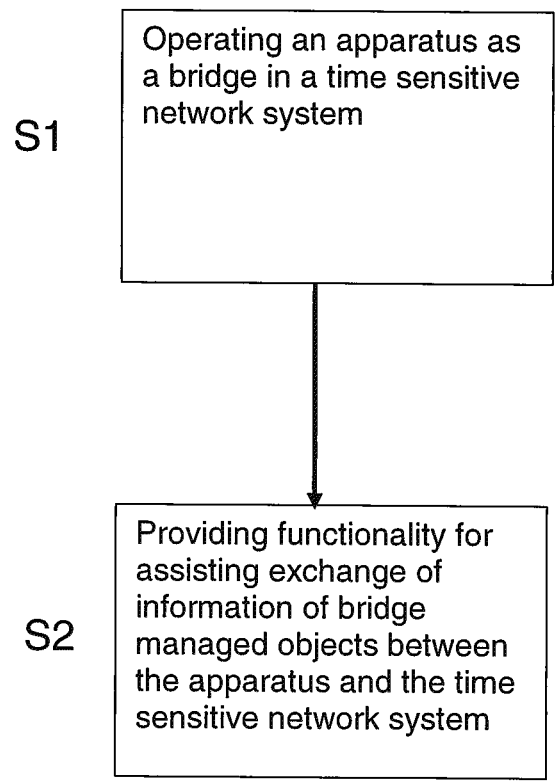
FIG. 4 schematically shows an example of a method according to an example.

FIG. 4 is a flow-chart of a method according to an example. The method as shown in FIG. 4 may be carried out by an apparatus. The apparatus may be, for example, a policy control function (PCF) or a user plane function (UPF).

As shown at S1, the method comprises operating an apparatus as a bridge in a time sensitive network system.

As shown at S2, the method comprises providing functionality for assisting exchange of information of bridge managed objects between the apparatus and the time sensitive network system.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory including computer program code, the at least one memory and the computer program code being configured, with the at least one processor, to cause the apparatus to perform:
   operating as a bridge in a time sensitive network system; and
   providing functionality for assisting exchange of information of bridge managed objects between the apparatus and the time sensitive network system, wherein the functionality comprises providing, to the time sensitive network system, a list of a plurality of the bridge managed objects supported by the apparatus in a format required by the time sensitive network system.

2. The apparatus according to claim 1, wherein the list of the plurality of bridge managed objects is use-case dependent.

3. The apparatus according to claim 1, wherein the apparatus comprises a Policy Control Function.

4. The apparatus according to claim 1, wherein the time sensitive network system comprises a fully centralized network configuration model or a centralized network or distributed user configuration model.

5. The apparatus according to claim 1, wherein the apparatus comprises a User Plane Function.

6. The apparatus according to claim 5, wherein the time sensitive network system comprises a distributed network configuration model.

7. The apparatus according to claim 1, wherein the functionality comprises making available information required for at least one service that is provided by the apparatus to one or more entities.

8. The apparatus according to claim 7, wherein the at least one service comprises one or more of: reading or requesting a bridge managed object; creating the bridge managed object; modifying or updating the bridge managed object; or deleting the bridge managed object.

9. The apparatus according to claim 7, wherein the apparatus comprises an interface for exposure of the information required for the at least one service, wherein the exposure of the information required for the at least one service comprises exposure of the information of the bridge managed objects to the one or more entities.

10. The apparatus according to claim 7, wherein the apparatus comprises an interface for receiving the information required for the at least one service from the one or more entities.

11. The apparatus according to claim 7, wherein the at least one memory and the computer program code are further configured, with the at least one processor, to cause the apparatus to perform activating or de-activating one or more policies based on data received from the one or more entities.

12. The apparatus according to claim 7, wherein the one or more entities comprises a time sensitive network Centralized Network Configuration entity or a network management function of a mobile network.

13. The apparatus according to claim 1, wherein the functionality comprises reporting a status of one or more of the bridge management objects of the apparatus.

14. The apparatus according to claim 13, wherein the at least one memory and the computer program code are further configured, with the at least one processor, to cause the apparatus to perform reporting only a status of one or more bridge management objects subscribed to by an application function, wherein the status is reported directly to the application function or is reported to the application function via a network exposure function.

15. The apparatus according to claim 14, wherein the application function comprises a time sensitive network Centralized Network Configuration entity or a management function of a 5G mobile network.

16. The apparatus according to claim 1, wherein the apparatus performs one or more operations as a Policy Control Function.

17. The apparatus according to claim 1, wherein the apparatus performs one or more operations as a User Plane Function.

* * * * *